(12) United States Patent
Yeo

(10) Patent No.: US 9,266,393 B2
(45) Date of Patent: Feb. 23, 2016

(54) CASTER WITH BRAKED SHAFT AND WHEEL AT ONCE

(76) Inventor: Shin Dong Yeo, Daegu (KR)

(*) Notice: Subject to any disclaimer, the term of this patent is extended or adjusted under 35 U.S.C. 154(b) by 0 days.

(21) Appl. No.: 14/233,128

(22) PCT Filed: Jul. 13, 2012

(86) PCT No.: PCT/KR2012/005618
§ 371 (c)(1),
(2), (4) Date: Apr. 11, 2014

(87) PCT Pub. No.: WO2013/019001
PCT Pub. Date: Feb. 7, 2013

(65) Prior Publication Data
US 2014/0238784 A1 Aug. 28, 2014

(30) Foreign Application Priority Data
Aug. 1, 2011 (KR) ........................ 10-2011-0076547

(51) Int. Cl.
*B60B 33/00* (2006.01)
*B60B 33/02* (2006.01)

(52) U.S. Cl.
CPC ........... *B60B 33/021* (2013.01); *B60B 33/0078* (2013.01); *B60B 33/025* (2013.01); *B60B 33/0042* (2013.01); *B60B 2200/22* (2013.01); *B60B 2200/24* (2013.01); *B60B 2200/43* (2013.01); *B60B 2900/321* (2013.01); *B60B 2900/3312* (2013.01); *B60B 2900/531* (2013.01)

(58) Field of Classification Search
CPC B60B 33/021; B60B 33/025; B60B 33/0078; B60B 33/0086

USPC ........................................................ 188/1.12
See application file for complete search history.

(56) References Cited

U.S. PATENT DOCUMENTS

| 5,988,323 A * | 11/1999 | Chu ............................ 188/1.12 |
| 8,776,314 B2 * | 7/2014 | Hofrichter et al. ........... 188/1.12 |
| 9,038,786 B2 * | 5/2015 | Lin .............................. 188/1.12 |
| 2010/0000050 A1 * | 1/2010 | Tsai ............................. 188/1.12 |
| 2010/0175222 A1 * | 7/2010 | Fallshaw et al. ............. 188/1.12 |

FOREIGN PATENT DOCUMENTS

| JP | 05-310004 | 11/1993 |
| JP | 09-58203 | 3/1997 |
| JP | 2010-36784 A | 2/2010 |
| KR | 10-2011-0086498 | 8/2011 |

* cited by examiner

*Primary Examiner* — Thomas J Williams
(74) *Attorney, Agent, or Firm* — John K. Park; Park Law Firm

(57) ABSTRACT

A simple operating caster is provided, which is braked by simple operation of brake pedal, and by which shaft and wheel are braked at once, as the equipped push-type brake pedal (12) to solid axle (13) can be installed always to the outside of bogie (11) exposed so that composed for the operation of user anytime, and brake and brake release of pivot (14) and wheel (15) is performed by the brake pedal (12) at once. The brake method is operated by brake pedal (12) and composed of the pivot brake part, and the wheel brake part, which brakes and releases brake of wheel (15), and pivot brake part and wheel brake part above is operated by push-type brake pedal (12) at once, and by which brake and brake release of pivot (14) and wheel (15) is performed at once, and as the pivot brake part and the wheel brake part is composed of each spring to be elastic-supported and buffered.

8 Claims, 9 Drawing Sheets

CASTER WITH BRAKED SHAFT AND WHEEL AT ONCE

TECHNICAL SCOPE

The invention concerns to the caster, which is operated simply and braked at once with shaft and wheel by simple operation of brake pedal.

TECHNICAL BACKGROUND

Generally at the bottom part of the object, which includes hospital bed, cart, handcart, mechanical equipment, furniture, chair and 4-wheeled hand cart etc (hereinafter called as 'cart'), at least more than one castor is installed provides ease transfer of objects including person.

The above castor is, for example, a domestically registered caster in utility model registration No. 20-0396105 (registered Sep. 1, 2005), which is equipped with a wheel, that performs rotation with/without 360° plane rotation centrally supporting shaft, and the mounted brake system of the castor performs brake through hindering of rolling motion of the wheel, which is the method of increasing friction by pressurizing surface of wheel in large.

Therefore, as the above brake system is a plane rotation structure with/without circling according to wheel, and has a negative effect of hiding inward according to moving direction of cart, when trying to brake or to release brake, man must experience inconveniences and troubles to find hidden casters inward of cart with pushing or rotating cart, moreover in worse, for example if the place were too narrow or low, then must have quite difficulties to pull the hidden castor out by hand or put some work tool into the bottom of cart.

Furthermore, in case of fixed type castor, which only requires driving straight ahead, can brake wheel with one brake system, while in case of rotating type castor, which is feasible for 360° plane rotation, has some inconvenient problems to use because of its structural characters, that one brake system to brake castor supporting shaft and another brake system to brake wheel are mounted respectively.

Furthermore, as its structure is to brake by the method of increased friction in large through pressurizing surface of wheel with friction pad of brake system, when braking it is required of braking pressure as considerable force, and also for releasing of braking power it is required considerable force too, so it is not only inconvenient, but also full of troubles frequently.

Problems to Solve

The invention is purposed to provide the castor, which can perform brake of shaft and wheel at once by easy operated push-type brake pedal.

The another purpose of the invention is to be characterized with the convenient operation anytime as the axis-installed brake pedal to upper part of solid axle can be always installed in expose to the outward direction of castor.

The other purpose of the invention is to be characterized with the extension of life time through the protection from excessive external force by elastic-supported and buffered of each spring of pivot brake part and wheel brake part.

The other purpose of the invention is to be characterized with the reliable brake by each spring of pivot brake part and wheel brake part.

Solutions to Problems

The invention is concerned to the castor, whose shaft and wheel is braked at once, and composed of pivot with axis- installed one pair of wheels, the above pivot, solid axle coupled at upper part and fixed to cart, brake pedal axis-installed to the above solid axle and protruded to one side, pivot brake part operated by the above brake pedal and braking pivot and wheel brake part operated by the above brake pedal and braking wheel, through which the castor can perform ease brake and releasing brake by the using of push-type brake pedal, because pivot and wheel of castor can be braked at once.

The above solid axle (13) is composed of cylindrical body (18) built with opened part (16) downward and top plate (17), main shaft (20) fixed at the center of the above top plate (17) vertically and protruded to body (18) up-down, screw part (21) of main shaft (20) protruded to the above body (18) upwards, main shaft (20) protruded to the above body (18) downwards, screw wrinkle (23) of C ring (22) built at lower section of the above main shaft (20), spline (24) built at lower section of the above body (18) inside in a fixed height and a fixed pitch and pivot brake part of the above main shaft (20) and body (18) inside.

The above pivot brake part is composed of plural supporting plate (27) supporting upper part of spring (26) coupled to fixed body (25) & opened part (16) built at upper part, one pair of shaft holes (28)(29) built at both sides of body (18) horizontally, shaft parts (30)(31) of brake pedal (12) axis-coupled to the above shaft holes (28)(29), coupling screw wrinkles (32)(33) built at inside of the above shaft parts (30)(31) respectively, one pair of turning members (39)(40) fixed by pieces (37)(38) after spline-coupling of coupling parts (35) (36) to the above coupling screw wrinkles (32)(33), working parts (41)(42) protruded to one side of the above turning members (39)(40) respectively, extension parts (44)(45) extended to one side of pressuring part (43) of brake pedal (12) and the above shaft parts (30) (31) built inside and opened part (46) built between the above extension parts (44)(45).

The above pivot (14) is composed of cylindrical body (48) built at opened part (47) upward, bottom part (49) built at lower section of the opened part (47), shaft tube (50) built at the center of bottom part (49) vertically, shaft hole (51) built in the center of shaft tube (50) to be axis-coupled to main shaft (20), protruded pipes (52)(53) built at the front and the rear of bottom part (49) in a fixed height, springs (54)(55) coupled to the protruded pipes (52)(53) respectively, coupling holes (58) (59) of springs (56)(57) built at both sides of the protruded pipe (52) one side, springs (60)(61) inserted to coupling holes (58)(59), cylindrical shaft member (62) built at lower section of body (48) vertically and leaned to one side, shaft rods (63)(64) fixed at the center of shaft member (62) and protruded ambilaterally, one pair of wheels (15) axis-coupled to shaft rods (63)(64) respectively, planar part (65) built the bottom part of shaft member (62) to rise in a fixed height and let wheel (15) not to contact the bottom, spline (67) in a fixed pitch built at rim (66) of wheel (15) inside and spline (24) of solid axle (13) is separated/coupled, wheel brake part to brake and release brake of wheel (15) coupled to guide hole (73) built at the center lengthwise and up-downed by brake pedal (12) and horizontal wrinkle (80) built at lower section of shaft member (62) to be able to couple C ring (22) and washer (79), by which main shaft (20) coupled to shaft hole (51) not to be separated.

Shortening of life time is prevented by preventing friction on ends of reinforced part (120) of main shaft (20) and shaft tube (50) of pivot (14) through the built gap (14a) between solid axle (13) and coupling pivot (14) and up-down one pair of washers (121)(122) to main shaft (20).

The above wheel brake part is composed of guide hole (73) built from the central part of plate body (68) to rim (66) in one-way, member of going up-down (74) up-downed by brake pedal (12) by coupling of both guide wrinkles (131) to guide hole (73), spline (75)(76) built at two-way upper side of member of going up-down (74) and brakes or releases brake wheel (15) by separating/coupling from/to spline (67) built at wheel (15), one pair of brake members (77)(78) at left and right performing seesaw motion by shaft mounted pivot pins (69)(70) on both sides of plate body (68), elastic-supporting parts (71)(72) built by extension to one-way upper part of brake members (77)(78), coupling part (72a) built upward on end of elastic-supporting parts (71)(72), springs (60)(61) to make elastic-supporting parts (71)(72) to elastic-supports downward centrically to pivot pins (69)(70) by coupling to protruded pipes (82)(83) of coupling part (71a) and elastic-supporting hole (81) and spring (130) controlling to couple protruded pipe (128) built on rim (66) and screw wrinkle (129) built on member of going up-down (74) and not to couple splines (75)(76) of member of going up-down (74) and spline (67) of rim (66) when non-brake.

The above elastic-supporting hole (81) composed of air hole (87) built at the center of body (86) to perform uplift movement by coupling to external surfaces of ring type body (86) and shaft tube (50), stumbling block (88) protruded at upper part of body (86) upward, one pair of front and rear protruded pipes (84)(85) protruded downwards of body (86) and coupled upper parts of springs (56)(57) respectively and one pair of left and right protruded pipes (82)(83) contacting upper parts of another springs (60)(61) respectively.

The above pivot brake part is composed of fixed body (25) fixed on the external surfaces of main shaft (20), up-down body (97) coupled to external surfaces of main shaft (20) for up-down and up-downed by brake pedal (12) and revolving body (90) coupled to external surfaces of main shaft (20) for up-down, and braked or brake released by stumbling to up-down body (97) or up-down body (97) & fixed body (25) while up-down revolving by brake pedal (12).

The above fixed body (25) is characterized with protruding type body (100) built at lower part, tilt part (101) & vertical part (102) built in turn at lower section of body (100) and vertical wrinkle (103) built at intersected part of tilt part (101) and vertical part (102) in longitudinal direction of main shaft (20) and vertical wrinkle (103) & vertical protruded part (104) are built in equal space & equal number for coupling & separation.

The above up-down body (97) is composed of air hole (106) coupled to main shaft (20) by building at inside of cylindrical body (105), protruded pipes (107)(108) built on the two-way external surfaces of the above body (105) symmetrically and pressurized by turning members (39)(40) of brake pedal (12), protruded part (111) & screw wrinkle (112) built at lower part of body (105) respectively and built at upper/lower section encountered by symmetrical tilt surfaces (109)(110) and plural vertical protruded parts (113) built at inside of air hole (106), which only allow up-down by coupling to vertical wrinkle (103) of fixed body (25) respectively while maintaining separation distance with main shaft (20).

The above revolving body (90) is composed of air hole (116) built at inside of cylindrical body (115) and coupled to main shaft (20), outward protruded rim (91) built at lower section of body (115), plural vertical protruded parts (104) built at inside of air hole (116) and brake released in case of coupled to vertical wrinkle (103) of fixed body (25) respectively while maintaining separation distance with main shaft (20), plural planar part (117) built at upper part of body (115) in a fixed space, protruded part protruded by rising planar part (117), vertical surface (118) protruded to upper part of planar part (117) by rising and tilt surface (119) penetrated into screw wrinkle (112) of up-down body (97) by building on one side of vertical surface (118) or stumbled by protruded part (111) in a fixed angle.

The above brake pedal (12) is characterized with the exposure outwards in a certain distance (L1) than frame surface (11a) of cart (11).

Effect of the Invention

The invented castor has the effect for usage in safe and convenient by performing of brake of pivot and wheel of castor at once by push-type brake pedal.

Furthermore, the invented castor has the effect to control any time, because the brake pedal installed on solid axle is exposed to the outside of cart, which is equipped with the castor.

Furthermore, the invented castor has the effect to extend life time by preventing excessive external force of pivot brake part and wheel brake part through buffer structure of spring.

Furthermore, the invented castor has the effect to perform reliable brake by buffer structure of spring, so it would be very useful invention.

DETAILED DESCRIPTION OF EMBODIMENTS OF INVENTION

Figure 1:
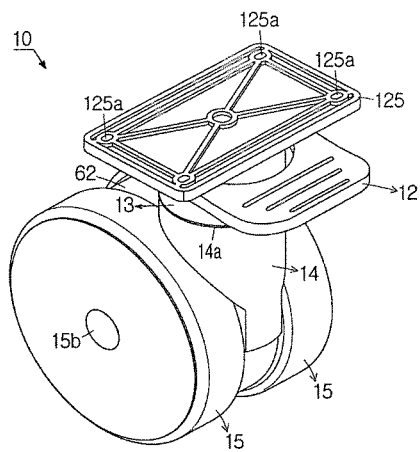
FIG. 1: appearance side view shown by a diagram as an instance of the invention.
Figure 2:
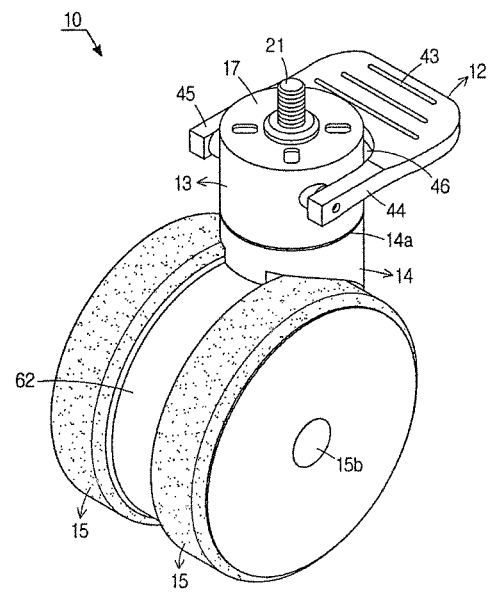
FIG. 2: appearance side view shown by a diagram as an instance of the invention, in the condition of separated fixed plate.

In following, I try to explain the desirable examples to perform about the invention according to the attached figures in detail. In the explanation of the examples to perform about the invention, the same components in figures were recorder with same symbols as possible, and the related composition of notices and the definite explanation about the function were omitted to avoid the uncertainness for good understanding of the invention.

The invented castor (10), is used for cart (11), like hospital bed, general cart, handcart, mechanical equipment, furniture and chair etc. at least more than 1 pc by installation, and as push-type brake pedal (12) equipped to solid axle (13) can be installed to the outside of cart (11) always in exposed, provides ease operation for user any time, and brake & brake releasing of pivot (14) & wheel (15) is performed at once by brake pedal (12) conveniently.

The above brake method is operated by brake pedal (12), and composed of pivot brake part, which brakes & releases brake of pivot (14), and wheel brake part, which brakes & releases brake of wheel (15), and pivot brake part and wheel brake part are operated at once by push-type brake pedal (12), and brake & releasing brake of pivot (14) & wheel (15) are performed at once conveniently.

The above pivot brake part and wheel brake part is a structure of one pair of splines coupling, which is elastic-supported by spring, the brake of pivot (14) and wheel (15) is performed by coupled spline, and the brake is released by the separation of coupled spline.

Furthermore, spline is protected as the above pivot brake part and wheel brake part are composed for elastic-supporting and buffering by each spring, and brake and brake releasing is performed in quick and convenient as coupling and separation of spline is performed through the rotation of coupling shaft centrically 30° front and rear by brake pedal (12).

The invented castor (10) is largely composed of pivot (14) with axis-installed one pair of wheels (15), solid axle (13) coupled to upper part of pivot (14) and fastened to cart (11), brake pedal (12) axis-installed to solid axle (13) and protruded to one side, and pivot (14) brake part and wheel (15) brake part, which prevents rotation by brake pivot (14) and wheel (15) by brake pedal (12).

Figure 3:
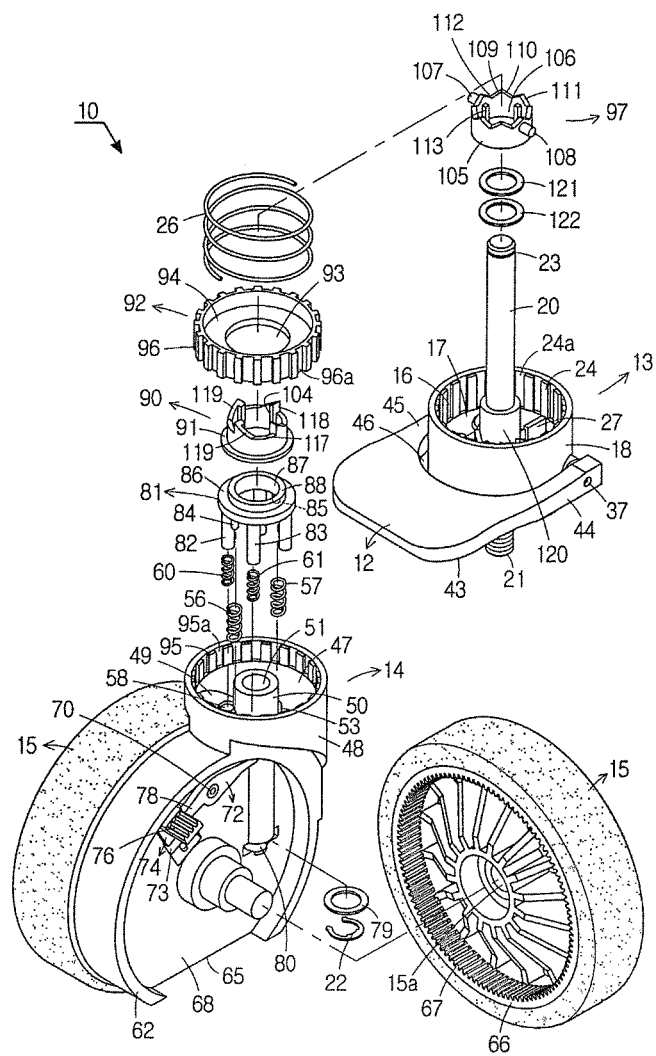
FIG. 3: disassembling side view shown by a diagram as an instance of the invention.
Figure 4:
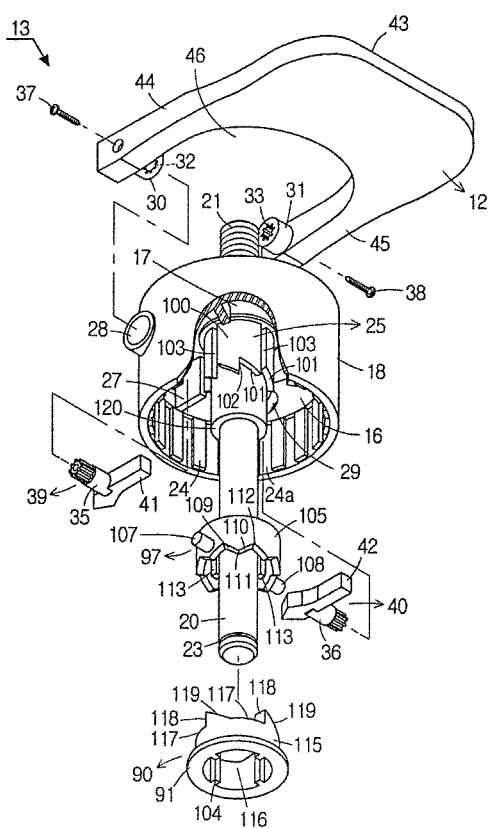
FIG. 4: disassembling of solid axle and partial incision side view shown by a diagram as an instance of the invention.

Solid axle (13) located at upper part of pivot (14) is, like FIGS. 3 & 4, composed of cylindrical body (18) with built opened part (16) downward and top plate (17), main shaft (20) protruded to body (18) up-down by fixing at the center of top plate (17) vertically, screw part (21) of main shaft (20) protruded to the upward of body (18), main shaft (20) protruded to body (18) downwards to make coupling with pivot (14), screw wrinkle (23) built at the lower section of main shaft (20) to make coupling C ring (22) and washer (70), spline (24) built in a fixed height and a fixed pitch at the lower section of inner side of body (18), fixed body (25) built at upper part of main shaft (20), plural supporting plates (27) supporting upper part of spring (26) coupled to opened part (16), one pair of shaft holes (28)(29) built at both sides of body (18) horizontally, shaft parts (30)(31) of brake pedal (12) axis-coupled to shaft holes (28)(29), coupling wrinkles (32)(33) built respectively at the inner part of shaft parts (30)(31), one pair of turning members (39)(40) fixed with pieces (37)(38) after spline-coupling of coupling parts (35)(36) to coupling screw wrinkles (32)(33), working parts (41)(42) protruded to one side of turning members (39)(40) respectively, extension parts (44)(45) built shaft parts (30)(31) at inside and extended to one side of pressuring part (43) of brake pedal (12), opened part (46) built between extension parts (44)(45) and pivot (14) brake part, which brakes and releases brake pivot (14) while operated by brake pedal (12), and pivot (14) has the structure of 360° plane revolving by coupled to lower section of main shaft (20).

The above pivot (14) composed of cylindrical body (48) with built opened part (47) upward, bottom part (49) built at the lower section of opened part (47), shaft tube (50) built at the center of bottom part (49) vertically, shaft hole (51) built at the center of shaft tube (50) to make shaft coupling of main shaft (20), protruded pipes (52)(53) built in a fixed height at at the front and the rear of bottom part (49), springs (54)(55) coupled to protruded pipes (52) (53) respectively, coupling holes (58)(59) of springs (56) (57) built at both sides of protruded pipe (52) one sided, springs (60)(61) to be inserted coupling holes (58)(59), cylindrical shaft member (62) built in lower section of body (48) vertically built to one side leaned, shaft rods (63)(64) shaft member (62) protruded ambilaterally and fixed at the center, one pair of wheels (15) axis-coupled to shaft rods (63)(64) respectively, planar part (65) built by rising bottom part of shaft member (62) to a fixed height to prevent contact of wheel (15) to the bottom, spline (67) built at inside of rim (66) of wheel (15) and separated/coupled from/with spline (24) of solid axle (13) in a fixed pitch, wheel brake part, which brakes & releases brake of wheel (15) while up-down by brake pedal (12) after coupled to guide hole (73) at the center of shaft member (62) lengthwise and horizontal wrinkle (80) built at lower section of shaft member (62) to make coupling of C ring (22) & washer (79) to couple the coupled main shaft (20) to shaft hole (51) not to be separated.

As separated gap (14a) is built between solid axle (13) and pivot (14), even the external force were acted, solid axle (13) upper and pivot (14) of bottom part cannot be contacted each other, therefore pivot (14) axis-coupled to main shaft (20) provides 360° free rotation for main shaft (20) centrically.

The above wheel brake part is composed of guide hole (73) built from central part of plate body (68) to one-way of rim (66), member of going up-down (74) up-downed by brake pedal (12) coupled two-way guide wrinkle (131) to guide hole (73), splines (75)(76) built at two-way upper sides of member of going up-down (74) and brakes or releases brake of wheel (15) by separated/coupled from/with spline (67) built on wheel (15), one pair of brake members (77)(78) left and right perform seesaw motion by shaft-mounted to pivot pins (69)(70) on both sides of plate body (68), elastic-supporting parts (71)(72) built by extension to upper part of brake members (77)(78) at one-way, coupling part (72a) built at ends of elastic-supporting parts (71)(72) upward, springs (60)(61) to make elastic-supporting parts (71)(72) elastic-support downward centrally to pivot pins (69)(70) by coupling protruded pipes (82)(83) of elastic-supporting hole (81) and coupling part (71a), and spring (130), which is coupled to protruded pipe (128) built on rim (66) and screw wrinkle (129) built on member of going up-down (74), and controls not to be coupled splines (75)(76) of member of going up-down (74) to spline (67) of rim (66) when non-brake.

The above elastic-supporting hole (81) is composed of ring type body (86), air hole (87) built at the center of body (86) to perform uplift movement by coupling to external surfaces of shaft tube (50), stumbling block (88) protruded at upper part of body (86), one pair of protruded pipes (84) (85) front and rear coupled to upper parts of springs (56) (57) respectively and protruded to body (86) downwards and one pair of protruded pipes (82)(83) left and right contacted to upper part of another springs (60)(61) respectively.

At upper part of body (86) of elastic-supporting hole (81) lower bottom surfaces of protruded rim (91) built at revolving body (90) surface-contacts, and at the upper part of protruded rim (91) elastic-supported by spring (26), and cylindrical moving body (92) is coupled to brake and release brake while performing uplift movement.

Air hole (93) built at the center of moving body (92) is coupled to upper side of protruded rim (91) in surface-contact method, bottom part of spring (26) is elastic-supported at opened part (94) upward, at outer surfaces of body by connecting of spline (24) of solid axle (13) and spline (95) built at inside of body (48) of pivot (14) circle spline (96) is built, which brakes pivot (14) and wheel (15) at once or releases brake at once.

The brake part of pivot (14) is largely composed of fixed body (25) fixed on the external surfaces of main shaft (20), up-down body (97) coupled to external surfaces of main shaft (20) to up-down and up-downed by brake pedal (12) and revolving body (90) coupled to external surfaces of main shaft (20) to up-down and stumbled by up-down body (97) or up-down body (97) & fixed body (25) while up-down revolving by brake pedal.

At lower part of fixed body (25) protruding type body (100) is built around, and at lower section of body (100) tilt part (101) and vertical part (102) if built in turn built, and at the intersected part of tilt part (101) and vertical part (102) vertical wrinkle (103) of main shaft (20) is built in longitudinal direction.

The above vertical wrinkle (103) is composed to build one tilt part (101) at every 2 steps to couple vertical protruded part (104) of revolving body (90), vertical wrinkle (103) and vertical protruded part (104) are built in equal space and equal number to be coupled and separated.

The above up-down body (97) is, air hole (106) is built inside of cylindrical body (105) coupled to main shaft (20), and at two-way external surface of body (105) protruded pipes (107)(108) are built symmetrically, which is pressurized by turning members (39)(40) of brake pedal (12), at bottom part of body (105) protruded part (111) and screw wrinkle (112) are built respectively built at the encountered upper/lower section of symmetrical tilt surfaces (109)(110), at inside of air hole (106) plural vertical protruded part (113) is built at main shaft (20) in longitudinal direction, which is coupled to vertical wrinkle (103) of fixed body (25) respectively and only allows up-down while maintaining separation distance with main shaft (20).

The above revolving body (90) is, air hole (116) is built at inside of cylindrical body (115) to which main shaft (20) is coupled, protruded rim (91) outward is built at lower section of body (115), if coupled to vertical wrinkle (103) of fixed body (25) respectively while maintaining separation distance with main shaft (20) at inside of air hole (116), then plural vertical protruded part (104), which releases brake, is built in longitudinal direction of main shaft (20), at upper part of body (115) plural planar part (117) is built in fixed space, protruded part (104) is protruded by rising the above planar part (117), tilt surface (119) in a fixed angle at one side of rising protruded vertical surface (118) to the top of planar part (117) is built to be penetrated into screw wrinkle (112) of up-down body (97) or stumbled by protruded part (111) to be braked or brake released.

In above, by the rotation of pivot (14), as end of reinforced part (120) reinforces partial outer surfaces of upper part of main shaft (20) and upper part of shaft tube (50) of pivot (14) result friction and abrasion through mutual contact, so by controlling reinforced part (120) and shaft tube (50) to be contacted by up-down one pair of washers (121)(122), inserted to main shaft (20), the abrasion of reinforced part (120) and shaft tube (50) and shortening of life time are prevented.

The invented castor (10) is the structure of main shaft (20) and wheel (15) being braked at once, altogether and instantly, furthermore, by stepping brake pedal (12) once brake and rising are performed, and by stepping another time brake releasing and rising are performed, therefore it is easy to brake and brake release, also simple to use. the above brake pedal (12) is returned rising by spring (26).

Figure 5:
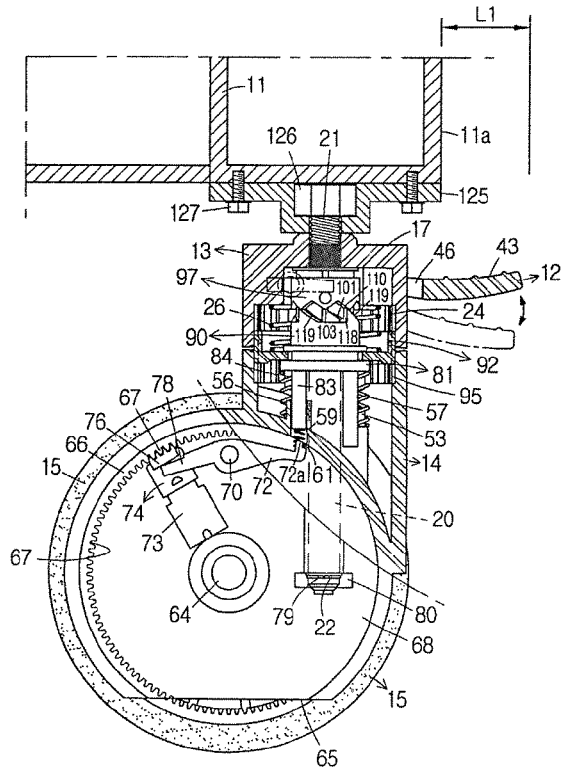
FIG. 5: cross-sectional diagram of brake condition shown by a diagram as an instance of the invention.
Figure 6:
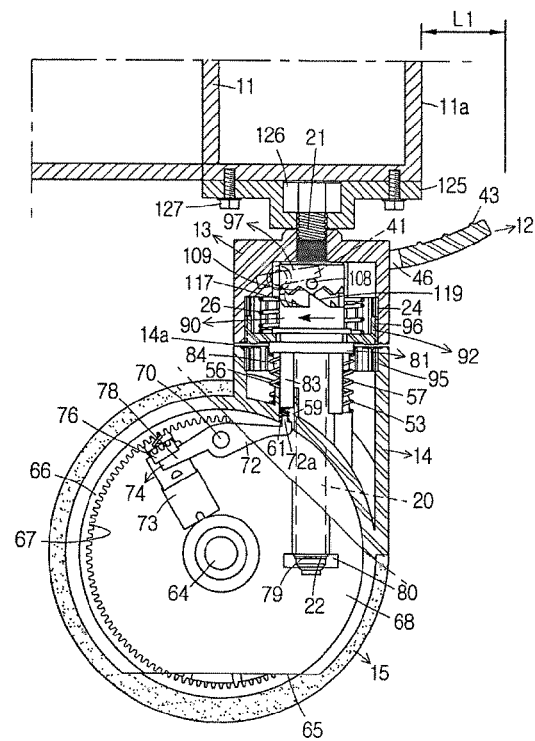
FIG. 6: cross-sectional diagram of brake released condition shown by a diagram as an instance of the invention.
Figure 7:
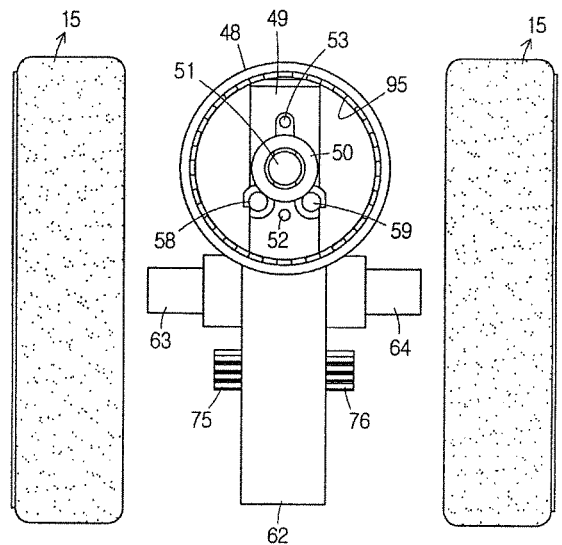
FIG. 7: disassembling plane figure shown by a diagram as an instance of the invention.
Figure 8:
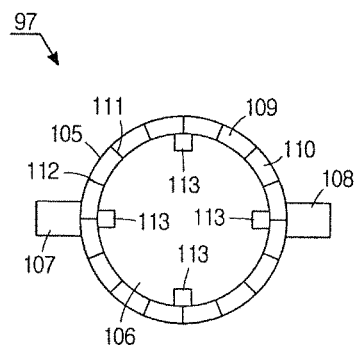
FIG. 8: plane figure of up-down body part shown by a diagram as an instance of the invention.
Figure 9:
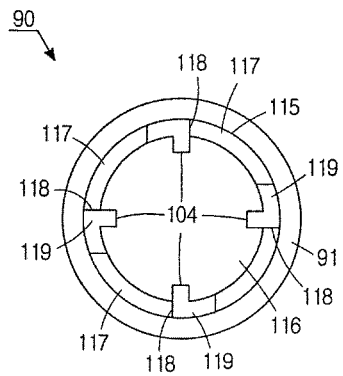
FIG. 9: plane figure of revolving body part shown by a diagram as an instance of the invention.
Figure 10:
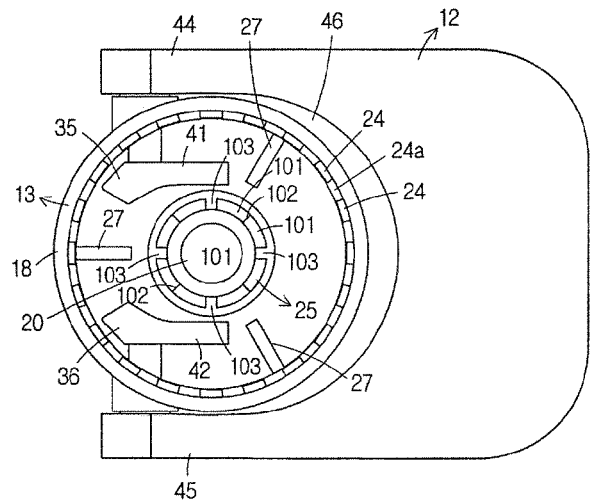
FIG. 10: base drawing of solid axle part shown by a diagram as an instance of the invention.

The above brake pedal (12), like FIGS. 5 & 6, is always exposed to a certain distance (L1) outwards than edge of cart (11) or frame surface (11a), so it can be used easily anytime and conveniently. Namely, in case of traditional castor, the situation, that brake pedal (12) moves to inward of frame surface (11a) according to wheel or hides, exists frequently and results various difficulties as described, however as the invented castor (10) has no situation like that, so man can operate anytime independent of moving location and direction of cart (11).

Figure 13:
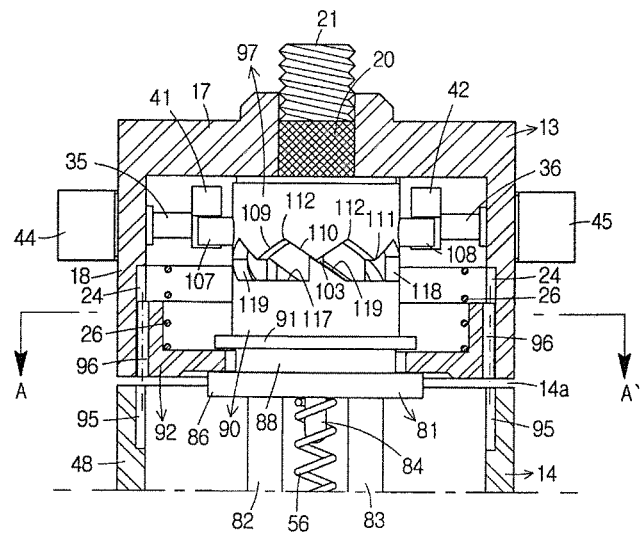
FIG. 13: partial enlarged cross-sectional diagram in brake condition shown by a diagram as an instance of the invention.

The invented castor (10) is usually by rising action of elastic-supporting hole (81) elastic-supported by springs (56) (57), like FIG. 13, brake is released by rising of moving body (92). The elastic force of springs (56)(57) is stronger than the elastic force of spring (26) of upper part, which elastic-supports moving body (92) downward, so rising state of moving body (92) is maintained.

As turning members (39)(40) axis-coupled to shaft holes (28)(29) of solid axle (13) is coupled to both sides of brake pedal (12), with stepping brake pedal (12) to rotate, then shaft holes (28)(29) are performed to do centrically descending rotation or rising rotation.

Figure 14:
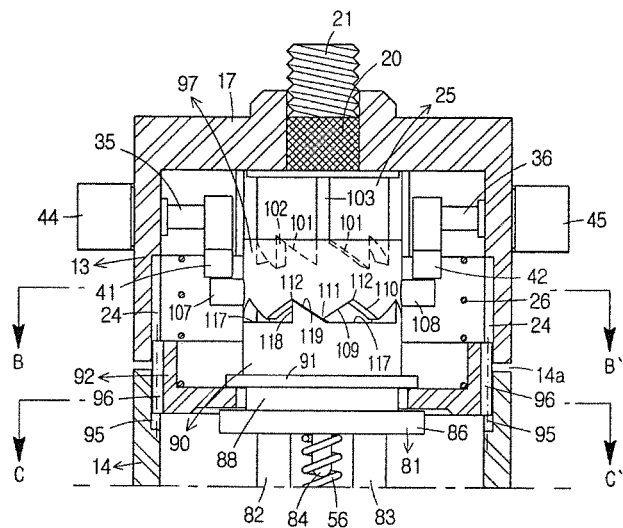
FIG. 14: partial enlarged cross-sectional diagram in brake released condition shown by a diagram as an instance of the invention.

If the turning members (39)(40) do descending rotation, as two-way protruded pipes (107)(108) is pressurized to working parts (41)(42) up-down body (97) becomes descending, at the moment vertical protruded part (113) is protruded into the inside of up-down body (97) and coupled to vertical wrinkle (103) of fixed body (25), so up-down is allowed but rotation is prohibited, therefore up-down body (97) does descending like FIG. 14.

Therefore, like FIG. 13, tilt surface (119) of revolving body (90) of surface-contacted to tilt surface (110) of up-down body (97) does descending while revolving, and as rotated tilt surface (119) of revolving body (90) and intersected upper part of vertical surface (118), like FIG. 14, penetrate into screw wrinkle (112) of up-down body (97) the rotation of revolving body (90) is stopped, and by descending action of revolving body (90), the moving body (92) stumbled by protruded rim (91) is braked through coupling of spline (96) bottom part of outer surface to spline (95) of pivot (14) by descending and rotation of pivot (14) is stopped.

At the same time of brake of pivot (14), springs (60) (61) elastic-supported elastic-supporting parts (71)(72) descend by descending action of elastic-supporting parts (81) and protruded pipes (82)(83), and member of going up-down (74) coupled to guide hole (73) rises, and brake splines (75)(76) of member of going up-down (74) two-way rise, and coupled to spline (67) of wheel (15), so the rotation of wheel (15) is stopped and brake is performed.

In the invention, because revolving body (90), which brakes pivot (14), and member of going up-down (74), which brakes wheel (15), are elastic-supported by spring respectively, even acted excessive external pressure on brake pedal (12) and brake part in a moment, damage or destruction of them is prevented through elastic-supporting and buffering.

Figure 20:
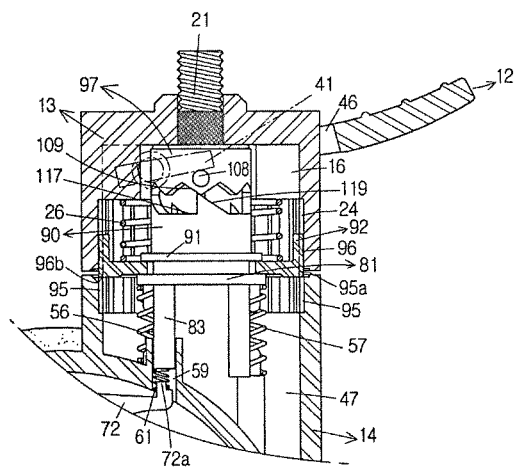
FIG. 20: enlarged cross-sectional diagram of pivot brake part shown by a diagram as an instance of the invention.

So to speak, when stepping brake pedal (12), revolving body (90) should descend and spline (96) is coupled to spline (95) of pivot (14), and pivot (14) must be braked, like FIG. 20, but if by rotation of pivot (14) lower bottom surface (96b) of spline (96) of revolving body (90) is contacted to upper side (95a) of pivot (14) spline (95) in a moment or in a certain time, and by which descending coupling (descending coupling of moving body spline) is prohibited, then brake of pivot (14) cannot be performed, and spline (96) of revolving body (90) and spline (95) of pivot (14) can be damaged, however revolving body (90) is elastic-supported by up-down springs (26) (56)(57), when braked descending force is acted by pressurizing force and upper part spring (26), therefore as spline (96) of revolving body (90) is coupled to spline (95) of pivot (14) and brake is performed with slight revolving of pivot (14), so damage of splines (95)(96) is prevented.

Figure 19:
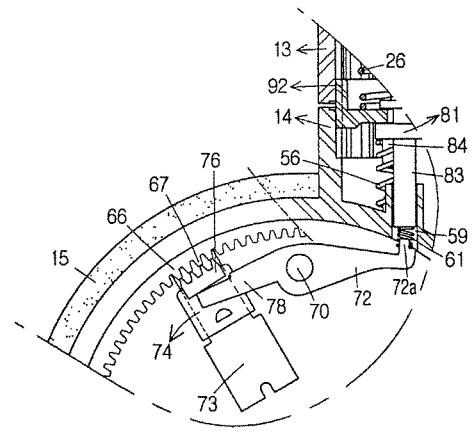
FIG. 19: enlarged cross-sectional diagram of wheel brake part shown by a diagram as an instance of the invention.

Furthermore, in case of member of going up-down (74), by stepping brake pedal (12), up-down body (97), revolving body (90) & elastic-supporting hole (81) are descended and then stumbled by fixed body (25) with revolving of revolving body (90), then spline (96) is coupled to spline (95) of pivot (14) and brake of pivot (14) should be performed, like FIG. 19, but as upper surfaces of splines (75)(76) of member of going up-down (74) are contacted to upper side of spline (67) of rim (66) in a moment or in a certain time by rotation of wheel (15), if spline coupling were prohibited, then brake of wheel (15) cannot be performed, but splines (75)(76) of member of going up-down (74) and spline (67) of rim (66) could be damaged, however as member of going up-down (74) is elastic-supported by springs (130) (60)(61), when braked, as descending force is acted by pressurizing force and upper part spring (130), splines (75) (76) of member of going up-down (74) and spline (67) of rim (66) are spline-coupled with only slight revolving of wheel (15) and brake of wheel (15) is performed, so damage or destruction of splines (67)(75)(76) is prevented.

Therefore, although not braked with non-performance of coupling of spline, but as spline of non-coupled state is coupled and by elastic-supporting power and buffering power of spring with slight revolving of pivot (14) or only slight revolving of wheel (15), so brake of pivot (14) and wheel (15) is performed quickly.

Furthermore, if releasing stepped brake pedal (12), then descended up-down body (97) to the maximum is raised by elastic force of springs (56)(57) and revolved in the opposite direction by tilt surface (119) action of revolving body (90), so up-down body (97) is raised by the action of tilt surface (110).

Figure 15:
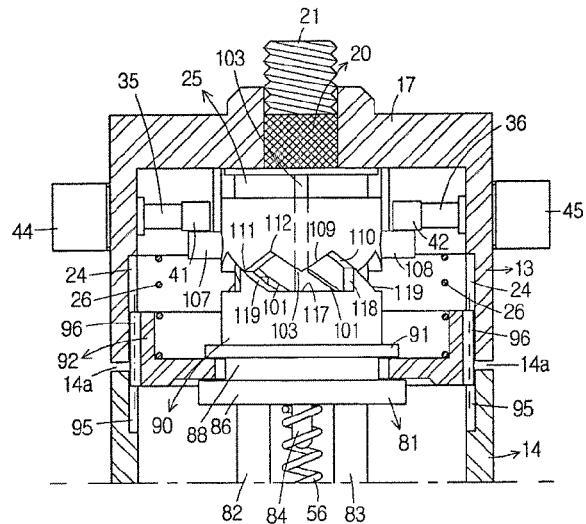
FIG. 15: partial enlarged cross-sectional diagram in the condition of down going for brake shown by a diagram as an instance of the invention.
Figure 16:
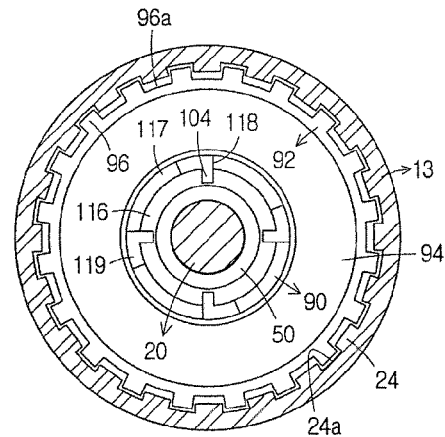
FIG. 16: cross-sectional diagram (spring omitted) of B-B' line of the invention FIG. 14.
Figure 17:
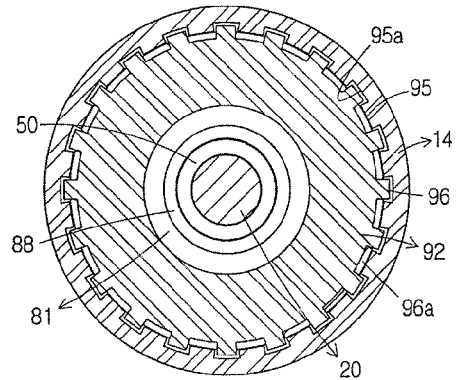
FIG. 17: cross-sectional diagram (spring omitted) of C-C' line of the invention FIG. 14.
Figure 18:
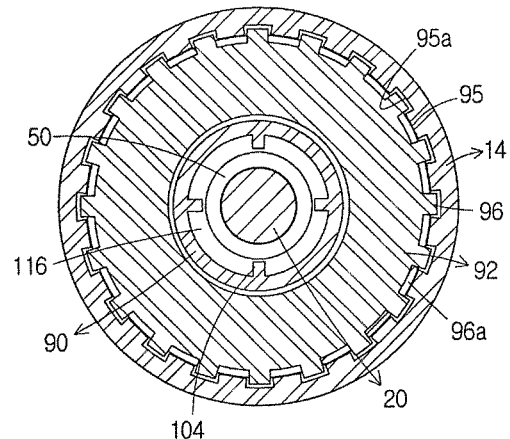
FIG. 18: cross-sectional diagram (spring omitted) of A-A' line of the invention FIG. 13.

At the moment, vertical protruded part (104) of revolving body (90) left vertical wrinkle (103) of fixed body (25) penetrates again into vertical wrinkle (103) of fixed body (25), like FIG. 15, rotation is restrained, at the moment, as tilt surface (119) of revolving body (90) and tilt surface (110) of up-down body (97) are overlapped slightly, when stepping brake pedal (12) it can be braked again by descending.

Figure 11:
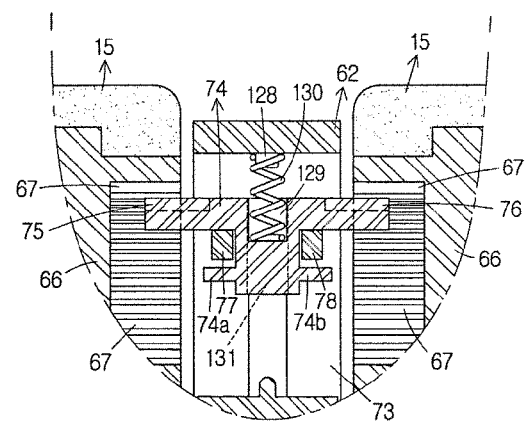
FIG. 11: cross-sectional diagram of wheel brake part in brake released condition shown by a diagram as an instance of the invention.
Figure 12:
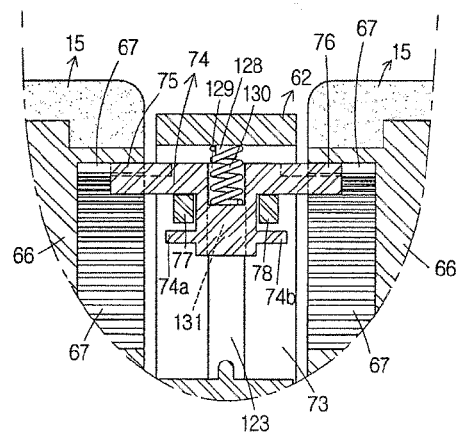
FIG. 12: cross-sectional diagram of wheel brake part in brake condition shown by a diagram as an instance of the invention.

As the elastic force of spring (130) is stronger than whole elastic forces of springs (60)(61) elastic-supported elastic-supporting parts (71)(72), usually if wheel (15) were not braked, like FIGS. 6 & 11, then splines (75)(76) are in a state of descending, and wheel (15) were in the state of brake by the movement of brake pedal (12), then up-down body (97), revolving body (90) & elastic-supporting hole (81) descend and stumbled by fixed body (25) through the rotation of revolving body (90), then elastic-supporting parts (71) (72) by protruded pipes (82)(83) of descended revolving body (90) and elastic-supporting hole (81), like FIG. 5, rotates pivot pins (69)(70) centrically clockwise, and by rising of brake members (77)(78) spline (76) is risen and coupled to spline (67) of rim (66), and then brake of wheel (15) is performed, on the contrary, by stepping brake pedal (12) once again to release brake, then protruded pipes (82)(83) of revolving body (90) and elastic-supporting hole (81) return with rising, by spring (130), which has more stronger elastic force than springs (60)(61) of elastic-supporting hole, like FIG. 6, elastic-supporting parts (71) (72) rotates pivot pins (69)(70) centrically counterclockwise, and splines (75)(76), coupled to spline (67) of rim (66), are descended and separated, so brake state of wheel (15) is released.

Non-explained symbol, (125) for top plate fixed to cart (11), (125a) for non-coupled coupling hole, (126) for nut, (127) for non-coupled, (74a)(74b) for supporting protruded part to prevent sagging of brake members (77)(78), (24a) (95a)(96a) for screw wrinkle of spline coupling, (15a) for wheel coupling hole, (15b) for wheel cap.

Explained invention above is not limited to the examples of the performance and attached figures, in the non-broken bounded scope of technical idea of the invention various substitution, transformation and alteration shall be possible, and this will be obvious to the person with usual understanding in the technical field, where the invention belonged.

REFERENCE NUMERALS (10)—castor
(11)—cart (object)
(12)—brake pedal
(13)—solid axle
(14)—pivot
(15)—wheel
(16)(46)(47)(94)—opened part
(17)—top plate
(18)(48)(86)(100)(105)(115)—body
(20)—main shaft
(21)—screw part
(22)—C ring
(23)(112)(129)—screw wrinkle
(24)(67)(75)(76)(95)(96)—spline
(26)(54)(55)(56)(57)(60)(61)—spring
(25)—fixed body
(27)—supporting plate
(28)(29)(51)—shaft hole
(30)(31)—shaft part
(32)(33)—coupling screw wrinkle
(35)(36)—coupling part
(37)(38)—piece
(39)(40)—turning member
(41)(42)—working part
(43)—pressuring part
(44)(45)—extension part
(49)—bottom part
(50)—shaft tube
(52)(53)(82)(83)(84)(85)(107)(108)—protruded pipe
(62)—shaft member
(63)(64)—shaft rod
(65)—planar part
(66)—rim of wheel
(68)—plate body
(69)(70)—pivot pin
(71)(72)—elastic-supporting part
(73)—guide hole (74)—member of going up-down
(77)(78)—brake member
(79)(121)(122)—washer
(80)—horizontal wrinkle
(81)—elastic-supporting hole
(87)(93)(106)(116)—air hole
(88)—stumbling block
(90)—revolving body
(91)—protruded rim
(92)—moving body
(97)—up-down body
(101)—tilt part
(102)—vertical part
(103)—vertical wrinkle
(104)(113)—vertical protruded part
(109)(110)(119)—tilt surface
(111)—protruded part
(117)—planar part
(118)—vertical surface
(120)—reinforced part
(131)—guide wrinkle

What is claimed is:

1. A caster comprising:
a pivot (14) in which a pair of wheels (15) being shaft-installed;
a solid axle (13) coupled to a top of the pivot (14) and fixed on a bogie (11);
a brake pedal (12) shaft-installed at the solid axle (13) and protruding to one side;
a pivot brake part operated by the brake pedal (12) and braking the pivot (14);
a wheel brake part operated by brake pedal (12) and braking the wheel (15),
wherein the caster is braked at once with the shaft and the wheel (15),
wherein the pivot brake part comprises:
a plurality of supporting plates (27) configured for supporting a top portion of a spring (26) engaging with a fixed body (25) formed at an upper part and a downward opened part (16);
a pair of shaft holes (28, 29) formed at both sides of the cylindrical body (18) horizontally;
shaft parts (30, 31) of the brake pedal (12), axis-coupled to the pair of shaft holes (28, 29);
coupling screw slots (32, 33) formed at an inside of the shaft parts (30, 31);
a pair of turning members (39, 40) fixed with pieces (37, 38) after spline-coupled to the coupling screw slots (32, 33) of coupling parts (35, 36);
working parts (41, 42) protruded respectively to a side of the pair of turning members (39, 40);
extension parts (44, 45) extended to one side of a pressuring part (43) of the brake pedal (12) and in which the shaft parts (30, 31) are formed; and
an opened part (46) formed between the extension parts (44, 45).

2. A caster comprising:
a pivot (14) in which a pair of wheels (15) being shaft-installed;
a solid axle (13) coupled to a top of the pivot (14) and fixed on a bogie (11);
a brake pedal (12) shaft-installed at the solid axle (13) and protruding to one side;
a pivot brake part operated by the brake pedal (12) and braking the pivot (14);
a wheel brake part operated by brake pedal (12) and braking a wheel (15), wherein the caster is braked at once with the shaft and the wheel (15),
wherein the pivot (14) comprises:
a cylindrical body (48) formed with an upward opened part (47);
a bottom part (49) formed at a lower section of the opened part (47);
a shaft tube (50) formed at a center of the bottom part (49) vertically;
a shaft hole (51) formed at a center of the shaft tube (50) so as to be axis-coupled to a main shaft (20);
protruded pipes (52, 53) formed in a fixed height at a front side and a rear side of the bottom part (49);
springs (54, 55) coupled to protruded pipes (52, 53) respectively;
coupling holes (58, 59) of springs (56, 57) formed at both sides of the protruded pipe (52) to one side;
springs (60, 61) inserted to the coupling holes (58, 59);
a cylindrical shaft member (62) formed in a lower section of body (48) vertically and formed lobsidedly;
shaft rods (63, 64) fixed at a center of the shaft member (62) and protruding ambilaterally;
a pair of wheels (15) axis-coupled to the shaft rods (63, 64);
a planar part (65) formed so as to rise in a fixed height of bottom part of the shaft member (62) so that the wheel (15) does not touch a bottom;
a spline (67) formed inside a rim of the wheel (15) and configured to be separated from or coupled with a spline (24) of the solid axle (13) in a fixed pitch;
a wheel brake part coupled with a guide hole (73), which is formed at a center of the shaft member (62) lengthwise and performs brake and releasing brake of the wheel (15) by up and down of the brake pedal (12); and
a horizontal slot (80) formed in a lower section of the shaft member (62), which provides coupling of the C ring (22) and a washer (79) so that the main shaft (20) is not separated from the shaft hole (51).

3. A caster comprising:
a pivot (14) in which a pair of wheels (15) being shaft-installed;
a solid axle (13) coupled to a top of the pivot (14) and fixed on a bogie (11);
a brake pedal (12) shaft-installed at the solid axle (13) and protruding to one side;
a pivot brake part operated by the brake pedal (12) and braking the pivot (14);
a wheel brake part operated by brake pedal (12) and braking a wheel (15),
wherein the caster is braked at once with the shaft and the wheel (15), and
further comprising:
a gap (14a) formed between the solid axle (13) and the pivot (14); and
a pair of washers (121, 122) on top of each other, each of which preventing friction between ends of a reinforced part (120) of the main shaft (20) and a shaft tube (50) of the pivot (14) by being coupled to the main shaft (20).

4. A caster comprising:
a pivot (14) in which a pair of wheels (15) being shaft-installed;
a solid axle (13) coupled to a top of the pivot (14) and fixed on a bogie (11);
a brake pedal (12) shaft-installed at the solid axle (13) and protruding to one side;
a pivot brake part operated by the brake pedal (12) and braking the pivot (14);

a wheel brake part operated by brake pedal (12) and braking a wheel (15), wherein the caster is braked at once with the shaft and the wheel (15), wherein the wheel brake part comprises:

a guide hole (73) formed in one-way of a rim (66) of the wheel (15) from a central part of a plate body (68);

an elevating member (74) coupling guide slots (131) on both sides to the guide hole (73) and elevating up and down by the brake pedal (12);

splines (75, 76) formed on both upper sides of the elevating member (74) and configured for braking or releasing brake of the wheel (15) by separating from and coupling with the spline (67) formed on the wheel (15);

a pair of brake members (77, 78), left and right, shaft mounted with pivot pins (69, 70) on both sides of the plate body (68) and configured to perform seesaw motion;

elastic-supported parts (71, 72), extended from and formed at one-way upper part of the brake members (77, 78);

a coupling part (72a) formed upward at ends of the elastic-supported parts (71, 72);

springs (60, 61) coupled to the coupling part (71a) and protruded pipes (82, 83) of a elastic-supporting hole (81) and configured to let the elastic-supported parts (71, 72) to the elastic-support pivot pin (69, 70) downward centrically; and a controlling spring (130) coupled to a protruded pipe (128) formed in the rim (66) and a screw slot (129) formed in the elevating member (74), and configured to let the spline (75, 76) of the elevating member (74) not to couple to a spline (67) of the rim (66) of the wheel (15) when non-braked, and wherein the elastic-supporting hole (81) comprises:

an air hole (87) formed at a center of a ring-shaped body (86) so as to perform uplift movement by coupling to an external surface of the ring-shaped body (86) and a shaft tube (50);

a stumbling block (88) protruded upwards at an upper part of the ring-shaped body (86);

a pair of protruded pipes (84, 85), front and rear, protruding downwards of the ring-shaped body (86) and configured to be coupled to upper parts of the springs (56, 57) respectively; and a pair of protruded pipes (82, 83), left and right, contacted by upper parts of another springs (60, 61) respectively.

5. A caster comprising:

a pivot (14) in which a pair of wheels (15) being shaft-installed;

a solid axle (13) coupled to a top of the pivot (14) and fixed on a bogie (11);

a brake pedal (12) shaft-installed at the solid axle (13) and protruding to one side;

a pivot brake part operated by the brake pedal (12) and braking the pivot (14);

a wheel brake part operated by brake pedal (12) and braking a wheel (15), wherein the caster is braked at once with the shaft and the wheel (15), and wherein the pivot (14) brake part comprises:

a fixed body (25) fixed on external surface of a main shaft (20);

an elevating body (97) coupled to external surface of the main shaft (20) and configured to be elevated up and down by the brake pedal (12); and a revolving body (90) coupled to external surface of the main shaft (20) to elevate up and down, and braked by elevating body (97) or being latched by the elevating body (97) and the fixed body (25) or released brake while elevating up and down and revolving by the brake pedal (12).

6. The caster according to claim 5, wherein the fixed body (25) comprises:

a protruding body (100) formed in a lower part;

a tilt part (101) and a vertical part (102) formed in a lower section of the body (100) alternatingly; and a vertical slot (103) formed in a longitudinal direction of the main shaft (20) at an intersection of the tilt part (101) and the vertical part (102), wherein the vertical slot (103) and a vertical protruding part (104) are formed with a same interval and in equal number.

7. The caster according to claim 5, wherein the elevating body (97) comprises:

an air hole (106) formed inside a cylindrical body (105) and coupled to the main shaft (20);

protruded pipes (107, 108) formed on external surfaces on both sides of the cylindrical body (105) symmetrically and pressurized by a turning members (39, 40) of the brake pedal (12);

a protruding part (111) and a screw slot (112) formed in a lower section of the body (105) respectively and formed in upper and lower sections where symmetrical tilt surfaces (109, 110) meet; and a plurality of vertical protruding parts (113) formed inside the air hole (106) and coupled to the vertical slot (103) of the fixed body (25) respectively, while maintaining separation distance, allowed only to elevate up and down.

8. The caster according to claim 5, wherein the revolving body (90) comprises:

an air hole (116) formed inside a cylindrical body (115) and coupled the with main shaft (20);

a rim (91) formed in a lower section of the body (115) and protruding outwards;

a plurality of vertical protruding parts (104) formed inside the air hole (116) and configured to brake released in case of being coupled to the vertical slot (103) of the fixed body (25) respectively, while maintaining separation distance with the main shaft (20);

a plurality of planar parts (117) formed at a top end portion of the body (115) with fixed intervals;

a protruding part protruded by rising over a planar part (117);

Vertical surface (118), protruded by rising to upward of planar part (117); and a tilt surface (119) tilted in a fixed angle, formed at one side of vertical surface (118) or stumbled to protruded part (111), and configured to penetrate into screw slot (112) of the elevating body (97).

\* \* \* \* \*